United States Patent [19]

Andrews

[11] Patent Number: 4,645,818

[45] Date of Patent: Feb. 24, 1987

[54] HEAT-CURABLE EPOXIDE RESIN COMPOSITIONS

[75] Inventor: Christopher M. Andrews, Cambridge, England

[73] Assignee: Ciba-Geigy Corporation, Ardsley, N.Y.

[21] Appl. No.: 807,564

[22] Filed: Dec. 11, 1985

[30] Foreign Application Priority Data

Dec. 22, 1984 [GB] United Kingdom ............... 8432606

[51] Int. Cl.$^4$ .................. C08G 59/44; C08G 59/46
[52] U.S. Cl. .................................. 528/93; 525/504;
528/94; 528/99; 528/117; 528/118; 528/119; 528/361; 528/365
[58] Field of Search ............... 528/93, 99, 117, 118, 528/119, 94, 361, 365; 525/504

[56] References Cited

U.S. PATENT DOCUMENTS

| | | |
|---|---|---|
| 3,386,955 | 6/1968 | Nawakowski et al. ......... 528/119 X |
| 3,386,956 | 6/1968 | Nawakowski et al. ............. 528/119 |
| 3,562,215 | 2/1971 | Moore .................................. 260/47 |
| 3,660,316 | 5/1972 | Schaefer et al. .................... 260/2 N |
| 3,717,612 | 2/1973 | Babayan ............................. 528/119 |
| 3,759,914 | 9/1973 | Simms et al. ..................... 528/93 X |
| 3,945,971 | 3/1976 | Harrison et al. ..................... 528/93 |
| 3,956,237 | 5/1976 | Doorakian et al. ............ 260/47 EN |
| 4,283,520 | 8/1981 | Moser et al. ........................... 528/93 |
| 4,360,469 | 11/1982 | Dietl et al. ...................... 260/396 R |
| 4,404,356 | 9/1983 | Andrews ........................ 528/119 X |
| 4,436,890 | 3/1984 | Kaufman ........................ 528/119 X |
| 4,507,445 | 3/1985 | Andrews ........................... 528/93 X |
| 4,594,373 | 6/1986 | Kohli ............................. 528/119 X |

FOREIGN PATENT DOCUMENTS

1265676 3/1972 United Kingdom .
1293142 10/1972 United Kingdom .

OTHER PUBLICATIONS

Derwent CPI Abstract 50727 C/29.
Derwent CPI Abstract 98482 E/46.

*Primary Examiner*—Earl Nielsen
*Attorney, Agent, or Firm*—Luther A. R. Hall

[57] ABSTRACT

Heat-curable compositions are described, comprising
(a) an epoxide resin and
(b) an effective amount of a urea of formula $$Ar-NHCON(R^3)R^4$$

where
Ar represents an aromatic group linked through an aromatic carbon atom to the indicated nitrogen atom and which is substituted by an amido group, and
$R^3$ and $R^4$ each represent an aliphatic, cycloaliphatic, or araliphatic hydrocarbyl group, optionally substituted by a halogen atom or a hydroxyl group, or $R^3$ may further represent a hydrogen atom, or $R^3$ nd $R^4$, together with the indicated nitrogen atom, may represent a heterocyclic ring of 3 to 5 carbon atoms which may also have one oxygen atom in the ring.

Such amidoarylureas may be used alone with the epoxide resin, or in combination with an accelerator for the heat-curing reaction, selected from dicyandiamide, carboxylic acid hydrazides, succinimide, cyanoacetamide, 1-cyano-3-(lower alkyl)guanidines, imidazoles, and carboxylic acid-tertiary amine salts.

20 Claims, No Drawings

HEAT-CURABLE EPOXIDE RESIN COMPOSITIONS

This invention relates to heat-curable epoxide resin compositions, to a process for their cure, and to cured products obtained by this process.

It is known that epoxide resins, i.e., substances containing on average more than one 1,2-epoxide group per molecule, may be cured by reaction with various classes of substances to form crosslinked, infusible, insoluble products having valuable technical properties.

U.S. Pat. No. 3,386,956 discloses the curing of epoxide resins by means of ureas represented by the following formulae

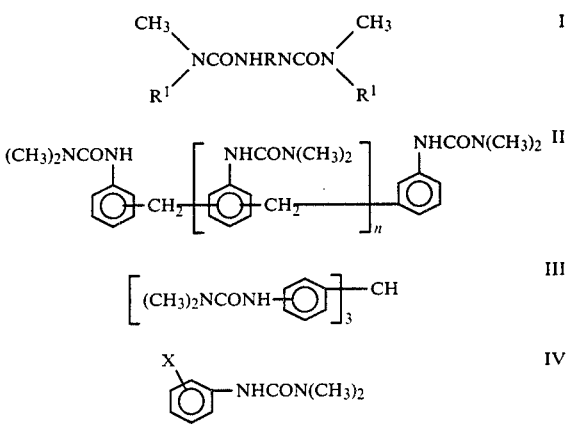

where

R represents a divalent radical selected from the group consisting of methyl-substituted phenylene, methylenediphenylene, dimethoxydiphenylene, and dimethyldiphenylene, $R^1$ represents —$CH_3$ or —$CH_2CH_2OH$, n is an integer of from 2 to 5, and X represents —$OCH_3$, —Cl, —H, —$CH_3$, or —$NO_2$.

The U.S. patent also discloses that the curing effect of these agents may be promoted by incorporating dicyandiamide, stearic hydrazide, adipic dihydrazide, succinimide, or cyanoacetamide in the curable compositions.

According to that patent, use of the aforesaid ureas overcomes a difficulty associated with curable epoxide resin compositions of the prior art, namely, that relatively high temperatures and relatively long curing times were needed if curing agents such as dicyandiamide were used, whereas if other, more reactive, curing agents or accelerators were used they caused premature curing at room temperature, i.e., they were not sufficiently latent.

U.S. Pat. No. 3,660,316 discloses that 1-cyano-3-(lower alkyl)guanidines also promote the curing of epoxide resins by bisureas of the formula II to IV.

Ureas of the foregoing formulae, in particular N-(4-chlorophenyl)-N',N'-dimethylurea and 2,4-bis(N,N-dimethylureido)-toluene, have been used commercially to cure epoxide resins, alone or with dicyandiamide as promotor, and also as promoters of the curing of epoxide resins with dicyandiamide.

However, because of increasingly severe requirements for curable compositions having long storage lives at room temperature but curing rapidly at moderately elevated temperatures (e.g., 120° C.), replacements for the above-mentioned ureas are now being sought.

In European Patent Publication EP-A-O 108 712 there are described heat-curable compositions comprising an epoxide resin and an effective amount of a m- or p-hydroxyphenylurea of formula

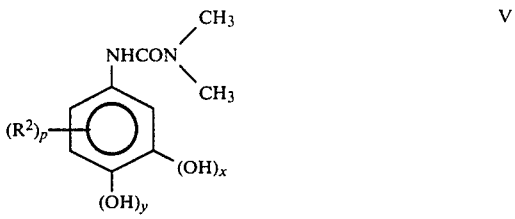

where $R^2$ denotes —$NH_2$, —$NO_2$, —Cl, —Br, or alkyl of 1 to 10 carbon atoms, p denotes zero, 1, or 2, x and y each denote zero or 1, and the sum of x+y is 1.

Heat-curable compositions comprising an epoxide resin and corresponding o-hydroxyphenylureas are described in U.S. Pat. No. 4,404,356.

It has now been found, surprisingly, that heat-curable epoxide resin compositions having very long storage lives at room temperature but curing rapidly at moderately elevated temperatures can be obtained by incorporating as curing agent a urea having an amido-substituted aromatic group.

This invention accordingly provides a heat-curable composition comprising (a) an epoxide resin and (b) an effective amount of a urea of formula $$Ar-NHCON(R^3)R^4 \qquad VI$$

where

Ar represents an aromatic group which is linked through an aromatic carbon atom to the indicated nitrogen atom and is substituted by an amido group, that is an unsubstituted or N-substituted carbamoyl group, and $R^3$ and $R^4$ each represent an aliphatic, cycloaliphatic or araliphatic hydrocarbyl group, which may be substituted by a halogen atom (preferably a chlorine atom) or by a hydroxyl group, with the proviso that $R^3$ may alternatively represent a hydrogen atom, or $R^3$ and $R^4$ together with the indicated attached nitrogen atom represent a heterocyclic ring containing 3 to 5 carbon atoms, and optionally one oxygen atom, in the ring.

There are further provided a process for curing epoxide resins comprising heating the heat-curable compositions of the invention and cured epoxide resins obtained by this process.

In formula VI, Ar preferably represents an aromatic group of 6 to 30 carbon atoms which is substituted by an amide group. It is further preferred that Ar represents an aryl group of 6 to 10 carbon atoms, preferably a phenyl group, which is substituted by an amido group and may also be substituted by one or more halogen atoms, amino or nitro groups or alkyl groups of 1 to 10 carbon atoms. Preferred ureas are amidophenylureas of formula

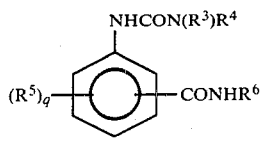

VII

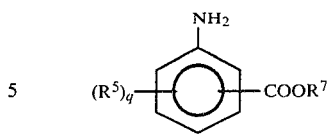

VIII where

R³ and R⁴ are as hereinbefore defined,

R⁵ represents a halogen atom, an amino or nitro group or an alkyl group of 1 to 10 carbon atoms, R⁶ represents a hydrogen atom or an alkyl group of 1 to 10 carbon atoms which may be substituted by a hydroxyl group, and q denotes zero, 1 or 2.

Preferably, R³ and R⁴ each represent an alkyl group of 1 to 6 carbon atoms, a hydroxyalkyl group of 2 to 4 carbon atoms, a cycloalkyl group of 3 to 7 carbon atoms or an aralkyl group of 7 to 9 carbon atoms. Specific examples of suitable groups R³ and R⁴ are methyl, ethyl, n-propyl, tert.butyl, cyclohexyl, 4-methylcyclohexyl, 2-hydroxyethyl and benzyl. Particularly preferred amidophenylureas are those where R³ and R⁴ each represent methyl or where R³ represents methyl and R⁴ represents 2-hydroxyethyl. When R³ and R⁴ together with the indicated attached nitrogen atom represent a heterocyclic ring, it may be, for example, a piperidino, morpholino or pyrrolidino ring.

Compounds where R³ and R⁴ are each other than methyl and other than where R³ represents methyl and R⁴ represents 2-hydroxyethyl are less reactive towards epoxide resins and so are useful as heat-curing agents where occurrence of too rapid a curing action, and evolution of considerable heat, may be deleterious.

In formula VII, q preferably denotes zero, or 1 with R⁵ representing —NO₂, —Cl or an alkyl group of 1 to 4 carbon atoms, particularly a methyl group.

Preferably, R⁶ represents a hydrogen atom, an alkyl group of 1 to 6 carbon atoms or a hydroxyalkyl group of 2 to 4 carbon atoms, especially hydrogen, or a methyl, n-butyl or 2-hydroxyethyl group.

Especially preferred amidophenylureas of formula VII are N-(2-carboxamidophenyl)-N',N'-dimethylurea, N-(3-carboxamidophenyl)-N',N'-dimethylurea, N-(4-carboxamidophenyl)-N',N'-dimethylurea, N-(2-carboxamido-4-chlorophenyl)-N',N'-dimethylurea, N-(2-carboxamido-5-chlorophenyl)-N',N'-dimethylurea, N-(2-carboxamido-4-nitrophenyl)-N',N'-dimethylurea, N-(2-carboxamido-4-methylphenyl)-N',N'-dimethylurea, N-(2-(N''-methylcarboxamido)phenyl)-N',N'-dimethylurea (i.e. 1-(2-(N-methylcarboxamido)phenyl)-3,3-dimethylurea), N-(2-(N''-butylcarboxamido)phenyl)-N',N'-dimethylurea (i.e. 1-(2-(N-butylcarboxamido)phenyl)-3,3-dimethylurea), N-(2-carboxamidophenyl)-N'-methyl-N'-(2-hydroxyethyl)urea, and N-(2-(N''-(2-hydroxyethyl)carboxamido)phenyl)-N',N'-dimethylurea (i.e. 1-(2-(N-(2-hydroxyethyl)carboxamido)phenyl)-3,3-dimethylurea.

Substituted ureas of formula VI are, in general, known or may be made by known methods. For example, they may be prepared by reacting an amine of formula

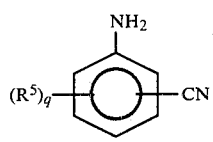

where

R⁵ and q are as hereinbefore defined, and

R⁷ representss an alkyl group of 1 to 4 carbon atoms, with phosgene to give the corresponding isocyanate, reacting the latter with an amine of formula

HN(R³)R⁴   IX where R³ and R⁴ are as hereinbefore defined, to give a phenylurea, and finally reacting this with ammonia or an amine of formula R⁶NH₂ to convert the ester group —COOR⁷ into an amide group —CONHR⁶.

The isocyanate- and urea-forming reactions are usually effected in an organic solvent.

Another convenient method of preparation, where R⁶ denotes a hydrogen atom, comprises reacting an amine of formula

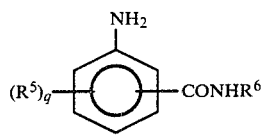

X where R⁵ and q are as hereinbefore defined, with phosgene to give the corresponding isocyanate, reacting the latter with an amine of formula IX to give a phenylurea and reacting this with hydrogen peroxide in aqueous alkali to convert the cyano group into —CONH₂.

In a further method of preparation, a benzamide of formula

XI where R⁵, R⁶ and q are as hereinbefore defined, is reacted with a carbamoyl halide of formula

X—CON(R³)R⁴   XII where

R³ and R⁴ are as hereinbefore defined, and

X represents a halogen, preferably a chlorine, atom.

This reaction is usually effected in an organic solvent in the presence or absence of an organic or inorganic base.

Other suitable methods of preparation are described in British Patent Specification No. 1 265 676.

The composition may contain a heat-curing amount of the urea (b). In this case, (b) is usually employed in an amount of 5 to 30, preferably 10 to 25, parts by weight per 100 parts by weight of the epoxide resin (a).

The heat-curing of epoxide resins with ureas of formula VI may be promoted by various accelerators. Thus the invention also provides a heat-curable composition comprising (a) and (b) which contains in addition (c) a minor amount by weight, based on the weight of (b), of an accelerator for the heat-curing, selected from dicyandiamide, carboxylic acid hydrazides, succinimide, cyanoacetamide, 1-cyano-3-(lower alkyl)guanidines in which the lower alkyl group or groups contain up to 3 carbon atoms, imidazoles, and salts of carboxylic acids with tertiary amines, the amount of (b) and (c) together constituting a heat-curing amount for the epoxide resin (a). Typically, (b) and (c) together comprise 10 to 25 parts by weight per 100 parts by weight of (a).

It has also been found that ureas of formula VI accelerate the heat-curing of epoxide resins with certain other compounds. Accordingly, there is further provided a heat-curable composition according to the invention which contains in addition (d) a major amount, based on the weight of (b), of a heat-curing agent for epoxide resins selected from dicyandiamide, melamine, carboxylic acid hydrazides, succinimide, cyanoacetamide, 1-cyano-3-(lower alkyl)-guanidines, the lower alkyl group or groups containing up to 3 carbon atoms, imidazoles and salts of carboxylic acids with tertiary amines, the amount of (d) and (b) together constituting a heat-curing amount for the epoxide resin (a). Typically, (d) and (b) together comprise 10 to 25 parts by weight per 100 parts by weight of (a).

Epoxide resins which may be employed in the composition are preferably those containing at least two groups of formula

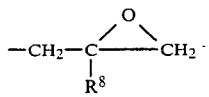

XIII directly attached to an atom or atoms of oxygen, nitrogen, of sulphur, where $R^8$ denotes a hydrogen atom or a methyl group.

As examples of such resins may be mentioned polyglycidyl and poly(beta-methylglycidyl)esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(beta-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene)-glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. They may also be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2bis(4-hydroxyphenyl)propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, m-xylylenediamine, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Epoxide resins hving the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

If desired, a mixture of epoxide resins may be used.

Preferred epoxide resins are polyglycidyl ethers, polyglycidyl esters, N,N'-diglycidylhydantoins, and poly(N-glycidyl) derivatives of aromatic amines. Specific preferred resins are polyglycidyl ethers of 2,2-bis(4-hydroxyphenyl)propane, of bis(4-hydroxypheny)methane, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)phenyl)methane, and p-(diglycidylamino)phenyl glycidyl ether.

When the accelerator (c) or the major curing agent (d) is a carboxylic acid hydrazide it is preferably stearic acid hydrazide, oxalic acid dihydrazide, adipic acid dihydrazide, sebacic acid dihydrazide, or isophthalic acid dihydrazide.

When the accelerator (c) or the major curing agent (d) is a 1-cyano-3-(lower alkyl)guanidine it is preferably the 3-methyl, 3,3-dimethyl, or 3,3-diethyl compound.

When the accelerator (c) or the major curing agent (d) is an imidazole it is preferably 2-phenylimidazole, N-methylimidazole, or 2-ethyl-4-methylimidazole.

When the accelerator (c) or the major curing agent (d) is a salt of a carboxylic acid with a tertiary amine it is preferably a salt of a hydroxycarboxylic acid, such as lactic acid or salicylic acid, with a Mannich base such as 2,4,6-tris(dimethylaminomethyl)phenol.

Normally the accelerator (c) will be present in a proportion of 10 to 50 parts by weight per 100 parts by weight of the urea (b), and the urea (b), when used as accelerator for the hardening agent (d), will be present in a proportion of 25 to 75 parts by weight per 100 parts by weight of (d).

The curable compositions may further contain suitable plasticizers such as dibutyl phthalate and dioctyl phthalate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of mixed tertiary, aliphatic, monocarboxylic acids, glycidyl acrylate, and glycidyl methacrylate. They may also contain additives such as fillers, reinforcing materials, polymeric toughening agents such as polyether sulfones, phenoxy resins, and butadiene-acrylonitrile rubbers, coloring matter, flow control agents, flame inhibitors, and mould lubricants. Suitable extenders, fillers and reinforcing materials are, for example, glass fibers, carbon fibers, fibers of aromatic polyamides, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, impregnating and casting resins, powder coatings, moulding compositions, putties and sealing compounds, potting and insulating compounds for the electrical industry, but especially adhesives and as primers for adhesives.

The compositions of this invention are preferably cured by heating them at a temperature in the range 100° C. to 180° C., especially 100° to 130° C. Usually, heating for 30 to 120 minutes suffices to achieve curing.

The following Examples illustrate the invention. Parts are by weight.

Ureas used in these Examples are prepared as follows:

PREPARATION 1

A solution of phosgene (44 g) in dry ethyl acetate (250 ml) is stirred at room temperature during the dropwise addition of a solution of methyl anthranilate (22.6 g) in dry ethyl acetate (75 ml). Stirring is continued for 3 days at room temperature and the ethyl acetate, together with excess phosgene are removed by distillation.

The distillation residue contains 2-carboxymethyl phenylisocyanate and this is dissolved in dry toluene (100 ml) under nitrogen. A solution of dimethylamine in toluene (50 ml; 28.8% dimethylamine) is added dropwise, the temperature being kept below 30° C. Toluene and excess dimethylamine are then removed by evaporation under reduced pressure and the crude product recrystallized from petroleum ether (300 ml; boiling range 60°–80° C.), to give N-(2-methoxycarbonylphenyl)-N',N'-dimethyl urea (21.2 g), m.pt. 85°–90° C.

This ester (20 g) is stirred with aqueous ammonia (500 ml; 35% NH$_3$) at room temperature for 5 days. A solid forms and is filtered off. Recrystallisation from ethanol gives N-(2-carboxamidophenyl)-N',N'-dimethylurea (11.8 g), m.pt. 185° C. (with decomposition).

PREPARATION 2

A solution of phosgene (20.8 g), in dry ethyl acetate (300 ml) is stirred at room temperature during the dropwise addition of 2-amino-5-nitrobenzonitrile (20 g) in dry ethyl acetate (100 ml). On complete addition the mixture is heated at 60° C. for 2 hours, and then at 75° C. for 2 hours. The mixture is purged with nitrogen to drive off some of the phosgene and the remainder of the phosgene, together with the ethyl acetate, is removed by distillation at atmospheric pressure. The residue is dissolved in dry toluene and made just alkaline with a solution of dimethylamine in toluene. The solid product is filtered off to give crude N-(2-cyano-4-nitrophenyl)-N',N'-dimethylurea (22.3 g). This is recrystallised from toluene to give a product melting at 184° C.

The recrystallised product (3.05 g) is stirred in acetone (16 ml) and hydrogen peroxide (26 ml; 100 vol.) is added dropwise, the mixture being maintained at pH 8–9, by addition of 2N aqueous sodium hydroxide solution, and at 10°–20° C. The mixture is allowed to stand for 16 hours and a further quantity of acetone (30 ml), followed by hydrogen peroxide (13 ml) are added. Stirring is continued for 2 hours then water (100 ml) is added. The precipitated solid is filtered off, washed with water and dried in vacuo at 65° C. to give N-(2-carboxamido-4-nitrophenyl)-N',N'-dimethylurea (3.05 g) m.pt. 220° C. (with decomposition).

PREPARATION 3

A solution of phosgene (17 g) in dry ethyl acetate (300 ml) is stirred at room temperature during the dropwise addition of methyl 2-amino-5-chlorobenzoate (15 g) in dry ethyl acetate (100 ml). The mixture is stirred at room temperature for 1½ hours and is then heated under reflux for ½ hour. The mixture is purged with nitrogen at 70°–80° C. to remove some of the excess phosgene and the remaining phosgene, together with the ethyl acetate, are removed by distillation at atmospheric pressure.

Dry toluene (100 ml) is added to the distillation residue, and the mixture adjusted to pH 8 by dropwise addition of a solution of dimethylamine in toluene (22 g; 28.8% dimethylamine). The mixture is allowed to stand at room temperature for 16 hours and is then filtered. The filtrate is evaporated to give N-(2-methoxycarbonyl-4-chlorophenyl)-N',N'-dimethylurea (19.5 g) m.pt. 114° C.

This ester (10 g) is mixed with aqueous ammonia (115 ml; 35% NH$_3$) and stirred at room temperature for 4 days. The solid that forms is filtered off and washed with water, then it is washed with toluene and dried at atmospheric pressure at room temperature. Recrystallisation from ethanol gives N-(2-carboxamido-4-chlorophenyl)-N',N'-dimethylurea (4.05 g) m.pt. 210° C. (with decomposition).

PREPARATION 4

A solution of hydrogen chloride (27.1 g) in methanol (192.2 g) is stirred at room temperature and 2-amino-4-chlorobenzoic acid (25 g) is added. The mixture is heated under reflux for 10 hours, then cooled and neutralised with a solution of sodium carbonate (20 g) in water (200 ml). The solid is filtered off, washed with water, and dried in vacuo at 65° C. to give methyl 2-amino-5-chlorobenzoate (15.5 g).

This ester (15 g) is dissolved in dry ethyl acetate (100 ml), the solution is added dropwise to a solution of phosgene (13.7 g) in dry ethyl acetate (300 ml), and then heated under reflux for 1 hour. The refluxing mixture is purged with nitrogen to eliminate some of the excess phosgene and the remainder, together with the ethyl acetate, is removed by evaporation under reduced pressure. The residue is a brown oil that crystallises on standing. It is dissolved in dry toluene (100 ml), adjusted to pH 8 by addition of a solution of dimethylamine in toluene (2.6 g; containing 28.8% dimethylamine). The solid is filtered off and the filtrate evaporated to give N-(2-methoxycaronyl-5-chlorophenyl)-N',N'-dimethylurea (18 g) m.pt. 99° C.

This ester (5.95 g) is stirred at room temperature with a solution of ammonia (10.6 g) in methanol (100 ml) for 4 days. The solid is filtered off and recrystallised from methanol to give N-(2-carboxamido-5-chorophenyl)-N',N'-dimethylurea (1.6 g) m.pt. 192° C. (with decomposition).

PREPARATION 5

A solution of phosgene (16.3 g) in dry ethyl acetate (300 ml) is stirred at room temperature and a solution of 2-methoxycarbonyl-4-methylaniline (16.5 g) in dry ethyl acetate (100 ml) added dropwise. On complete addition the mixture is heated under reflux for 1 hour, then most of the excess phosgene is removed using a nitrogen purge. The residual phosgene, together with the ethyl acetate, is removed in vacuo. The residue is dissolved in toluene (100 ml) and a solution of dimethylamine in toluene (16.0 g; 28.8% dimethylamine) is added the temperature being maintained below 30° C. during the addition. The mixture is filtered, and the filtrate evaporated to give an oil that crystallises on cooling. This is recrystallised from petroleum ether (boiling range 60°-80° C.) to give N-(2-methoxycarbonyl-4-methylphenyl)-N', N'-dimethylurea, m.pt. 92° C.

This ester (15.0 g) is stirred at room temperature with 35% aqueous ammonia (400 ml) for 7 days. The solid that forms is filtered off, washed with water, and recrystallised from ethanol to give N-(2-carboxamido-4-methylphenyl)-N',N'-dimethylurea (3.3 g), m.pt. 191° C. (with decomposition).

PREPARATION 6

A solution of phosgene (26.4 g) in dry ethyl acetate (300 ml) is stirred at 10° C. and a solution of methyl 3-aminobenzoate (22 g) in dry ethyl acetate (100 ml) is added dropwise over 30 minutes. The mixture is heated under reflux with a slow nitrogen purge for 1 hour, then heating is stopped and the rate of nitrogen flow is increased. After a further hour the mixture is evaporated and the residue dissolved in toluene. To this solution is added a solution of dimethylamine in toluene (35.5 g; 28.8% dimethylamine) to pH 7-8. The mixture is filtered and the filtrate evaporated to give N-(3-methoxycarbonylphenyl)-N',N'-dimethylurea (30.5 g), m.pt. 110° C.

This ester (15.0 g) is stirred at room temperature with 35% aqueous ammonia (200 ml) for 4 days. The mixture is filtered and the residue washed with water and dried. Recrystallisation from ethanol gives N-(3-carboxamidophenyl)-N',N'-dimethylurea (4.0 g), m.pt. 220° C.

PREPARATION 7

4-Aminobenzamide (10 g) in dioxan (75 ml) and triethylamine (14.8 g) is stirred at 40° C. and dimethylcarbamoyl chloride (15.8 g) is added dropwise over 20 minutes. On complete addition the mixture is heated at 60° C. for 40 hours. Water (350 ml) is added and the mixture stirred for a further 2 hours at room temperature. The solid is filtered off, washed with water, and the filtrate is evaporated in vacuo. The residue is suspended in water (70 ml), filtered off, and washed with water to give N-(4-carboxamido)-N',N'-dimethylurea (3.0 g) m.pt. 240° C. (with decomposition).

PREPARATION 8

N-(2-Methoxycarbonylphenyl)-N',N'-dimethyl urea (5.0 g; prepared as described in Preparation 1) and n-butylamine (8.2 g) are stirred together at 45°-55° C. for 16 hours. The solid that forms is filtered off and recrystallised from petroleum ether, boiling range 60°-80° C. to give N-(2-(N''-butylcarboxamido)phenyl)-N',N'-dimethylurea (0.8 g), m.pt. 106° C.

PREPARATION 9

N-(2-Methoxycarbonylphenyl)-N',N'-dimethyl urea (5.0 g; prepared as described in Preparation 1) and 25% aqueous methylamine (25 ml) are stirred at 45°-50° C. for 2½ hours and are then evaporated. The residue is recrystallised from petroleum ether, boiling range 60°-80° C. to give N-(2-(N'''-methylcarboxamido)-phenyl)-N',N'-dimethylurea (0.6 g) m.pt. 139° C.

PREPARATION 10

A solution of 2-methoxycarbonyl phenylisocyanate (21.7 g) in ethyl acetate (116 g) is added dropwise to N-methylethanolamine (22.5 g), the mixture being stirred and cooled to keep the temperature below 36° C. The upper layer of the resulting mixture is separated and distilled at 60° C. under reduced pressure to remove ethyl acetate. The white solid residue remaining is triturated with ether, filtered, washed with ether and then dried in air to give N-(2-methoxycarbonylphenyl)-N'-methyl-N'-(2-hydroxyethyl)urea (22.4 g), m.pt. 90° C.

This ester (10 g) is added to a solution of ammonia (19.5 g) in methanol. The mixture is stirred to complete dissolution and the resulting solution is left for 21 days at room temperature. Methanol is then removed by distilling the solution at 50° C. under reduced pressure. The solid residue is triturated with ether, filtered and washed with ether to give 8.3 g of crude product, m.pt. 126° C. (with decomposition). After washing with water and recrystallising from a mixture of isopropanol and petroleum ether (boiling range 60°-80° C.), pure N-(2-carboxamidophenyl)-N'-methyl-N'-(2-hydroxyethyl)urea (5.6 g), is obtained, m.pt. 134° C. (with decomposition).

PREPARATION 11

A mixture of N-(2-methoxycarbonylphenyl)-N',N'-dimethylurea (20 g; prepared as described in Preparation 1), ethanolamine (50 ml) and methanol (50 ml) is stirred at 45°-50° C. for 10 hours. After cooling, diethyl ether is added, whereupon an oil separates. The oil is washed three times with ether and then allowed to stand for 2 days in the presence of ether. The crystals which form are filtered off, washed with ether and then with a mixture of isopropanol and petroleum ether (boiling range 60°-80° C.) and dried in air to give 8.85 g of product, m.pt. 140° C. (with decomposition). The product is further purified by washing with isopropanol, filtering, washing with petroleum ether (boiling range 60°-80° C.) and drying to give 1-(2-(N-(2-hydroxyethyl)carboxamido)phenyl)-3,3-dimethylurea (7.8 g), m.pt. 143° C. (with decomposition).

"Epoxide Resin I" denotes a polyglycidyl ether of 2,2-bis(4-hydroxyphenyl)propane having a 1,2-epoxide content of 5.16 equivalents per kilogram and a viscosity at 21° C. of 24.5 Pa s.

"Epoxide Resin II" denotes a tetrakis(N-glycidyl) derivative of bis(4-aminophenyl)methane, i.e. bis(4-(diglycidylamino)phenyl)methane, having an epoxide content of 7.8–8.2 equivalents per kilogram.

EXAMPLE 1

A mixture of 100 parts of Epoxide Resin I, 15 parts of N-(2-carboxamidophenyl)-N',N'-dimethylurea, 25 parts of aluminium powder (passing 200 mesh, British Standard 410), and 5 parts of a finely divided silica thixotropic agent is prepared by triple roller mixing and is used to prepare single lap joints 2.54 cm × 1.27 cm, using degreased and pickled aluminum alloy sheets available under the designation "2L 73 Alclad" ("Alclad" is a registered Trade Mark). The mixture is cured by being heated for 1 hour at 120° C. The shear strength of the bond is 30.3 MPa.

EXAMPLE 2

Mixtures A–I are prepared by triple roller mixing and their gelation times are measured by placing approximately 0.1 g of each mixture onto a metal block heated at the indicated temperature, and observing the time taken for gelation to occur.

The compositions of the mixtures are given in Table I, and the gel times in Table II.

agent is prepared on a triple roll mixer. This mixture is stable for 10 weeks at 40° C. Its gel times at various temperatures, measured as described in Example 2, are as follows:

120° C.-35 minutes
130° C.-22 minutes
150° C.-18 minutes

EXAMPLE 4

Example 3 is repeated, replacing the urea used in that Example by N-(2-N''-methylcarboxamido)penyl)-N',N'-dimethylurea (16parts). The mixture is stable for 9 weeks at 40° C. and gels after 21½ minutes at 120° C.

EXAMPLE 5

A mixture of 100 parts of Epoxide Resin I, 17.1 parts of N-(2-carboxamidophenyl)-N'-methyl-N'-(2-hydroxyethyl)urea and 5 parts of an asbestos-based thixotropic agent is prepared on a triple roll mixer. This mixture is stable for 30 days at 40° C. Its gel time, measured as described in Example 2, is 22 minutes at 120° C.

EXAMPLE 6

Example 5 is repeated, replacing the urea used in that Example by 1-(N-(2-hydroxyethyl)carboxamidophenyl)-3,3-dimethylurea (18 parts). The mixture is

TABLE I

| Component | Mixture | | | | | | | | |
|---|---|---|---|---|---|---|---|---|---|
|  | A | B | C | D | E | F | G | H | I |
| N—(2-Carboxamido-phenyl)-N',N'—dimethyl urea | 15 | | | | | | | | 4.5 |
| N—(3-Carboxamido-phenyl)-N',N'—dimethyl urea | | 15 | | | | | | | |
| N—(4-Carboxamido-phenyl)-N',N'—dimethyl-urea | | | 15 | | | | | | |
| N—(2-Carboxamido-4-chlorophenyl)-N',N'—dimethylurea | | | | 17.5 | | | | 10 | |
| N—(2-Carboxamido-5-chlorophenyl)-N',N'—dimethylurea | | | | | 17.5 | | | | |
| N—(2-Carboxamido-4-nitro-phenyl)-N',N'—dimethyl-urea | | | | | | 18.2 | | | |
| N—(2-carboxamido-4-methyl-phenyl)-N',N'—dimethylurea | | | | | | | 16 | | |
| Dicyandiamide | | | | | | | | 4 | 7 |
| Epoxide Resin I | 100 | 100 | 100 | 100 | 100 | 100 | 100 | 100 | 100 |
| Asbestos-based thixo-tropic agent | 5 | 5 | 5 | 5 | 5 | 5 | 5 | 5 | 5 |

TABLE II

| Mixture | Gel time at | | | | | | | |
|---|---|---|---|---|---|---|---|---|
|  | 180° C. | 170° C. | 150° C. | 140° C. | 130° C. | 120° C. | 100° C. | 40° C. |
| A | | | | | | 12 min. | 41 min. | 17 weeks |
| B | | | | | | 43 min. | | >16 weeks |
| C | | 6 min. | 12 min. | | | 85 min. | | >1 year |
| D | 3 min. | | 3 min. | 4 min. | 8 min. | 15½ min. | | 15 weeks |
| E | | | | | | 10 min. | | 4 weeks |
| F | 2 min. | | 5 min. | | | 43 min. | | 11 weeks |
| G | | - | | | | 16½ min. | | 7 weeks |
| H | | | | | | 14 min. | | 19 weeks |
| I | | | | | | 20 min. | | 10 weeks |

EXAMPLE 3

A mixture of 100 parts of Epoxide Resin I, 19 parts of N-(2-(N''-butylcarboxamido)phenyl)-N',N'-dimethylurea, and 5 parts of an asbestos-based thixotropic stable for 4 weeks at 40° C.; it gels after 19 minutes at 100° C. and after 5¾ minutes at 120° C.

EXAMPLE 7

A mixture of 100 parts of Epoxide Resin II and 23 parts of N-(2-carboxamidophenyl)-N',N'-dimethylurea is prepared on a triple roll mixer. This mixture is stable for 31 days at 40° C. Its gel times at various temperatures, measured as described in Example 2, are as follows:

120° C.-11 minutes
140° C.-2.75 minutes

EXAMPLE 8

Example 7 is repeated, using 15 parts (instead of 23) of the urea. The mixture is stable for 31 days at 40° C. Its gel times are as follows:

120° C.-12½ minutes
140° C.-3 minutes

What is claimed is:

1. A heat-curable composition comprising
   (a) an epoxide resin and
   (b) an effective amount of a urea of formula $$Ar-NHCON(R^3)R^4 \qquad VI$$

where
Ar represents an aromatic group which is linked through an aromatic carbon atom to the indicated nitrogen atom and is substituted by an amido group, and
$R^3$ and $R^4$ each represent an aliphatic, cycloaliphatic, or araliphatic hydrocarbyl group, which may be substituted by a halogen atom or by a hydroxyl group, with the proviso that $R^3$ may alternatively represent a hydrogen atom, or $R^3$ and $R^4$ together with the indicated attached nitrogen atom represent a heterocyclic ring containing 3 to 5 carbon atoms, and optionally one oxygen atom, in the ring.

2. A composition according to claim 1, in which Ar represents a phenyl group which is substituted by an amido group and may also be substituted by one or more halogen atoms, amino or nitro groups, or alkyl groups of 1 to 10 carbon atoms.

3. A composition according to claim 1, in which (b) is an amidophenylurea of formula

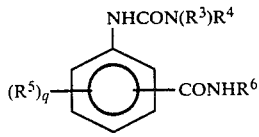

VII where
$R^3$ and $R^4$ are as defined in claim 1,
$R^5$ represents a halogen atom, an amino or nitro group or an alkyl group of 1 to 10 carbon atoms,
$R^6$ represents a halogen atom or an alkyl group of 1 to 10 carbon atoms which may be substituted by a hydroxyl group, and
q denotes zero, 1 or 2.

4. A composition according to claim 3, in which $R^3$ and $R^4$ each represent an alkyl group of 1 to 6 carbon atoms, a hydroxyalkyl group of 2 to 4 carbon atoms, a cycloalkyl group of 3 to 7 carbon atoms or an aralkyl group of 7 to 9 carbon atoms.

5. A composition according to claim 4, in which $R^3$ and $R^4$ each represent a methyl group, or $R^3$ represents a methyl group and $R^4$ represents a 2-hydroxyethyl group.

6. A composition according to claim 3, in which q denotes zero, or 1 with $R^5$ representing —NO₂, —Cl or a methyl group.

7. A composition according to claim 3, in which $R^6$ represents a hydrogen atom, an alkyl group of 1 to 6 carbon atoms or a hydroxyalkyl group of 2 to 4 carbon atoms.

8. A composition according to claim 3, in which (b) is N-(2-carboxamidophenyl)-N'N'-dimethylurea, N-(3-carboxamidophenyl)-N',N'-dimethylurea, N-(4-carboxamidophenyl)-N',N'-dimethylurea, N-(2-carboxamido-4-chlorophenyl)-N',N'-dimethylurea, N-(2-carboxamido-5-chlorophenyl)-N',N'-dimethylurea, N-(2-carboxamido-4-nitrophenyl)-N',N'-dimethylurea, N-(2-carboxamido-4-methylphenyl)-N',N'-dimethylurea, N-(2-(N''-methylcarboxamido)phenyl)-N',N'-dimethylurea, N-(2-(N''-butylcarboxamido)phenyl)-N',N'-dimethylurea, N-(2-carboxamidophenyl)-N'-methyl-N'-(2-hydroxyethyl)urea or N-(2-(N''-(2-hydroxyethyl)-carboxamido)phenyl)-N',N'-dimethylurea.

9. A composition according to claim 3, which contains a heat-curing amount of (b).

10. A composition according to claim 3, which contains in addition
    (c) a minor amount by weight, based on the weight of (b), of an accelerator for the heat-curing, selected from dicyandiamide, carboxylic acid hydrazides, succinimide, cyanoacetamide, 1-cyano-3-(lower alkyl)guanidines in which the lower alkyl group or groups contain up to 3 carbon atoms, imidazoles, and salts of carboxylic acids with tertiary amines, the amount of (b) and (c) together constituting a heat-curing amount for the epoxide resin (a).

11. A composition according to claim 10, which contains from 10 to 50 parts of (c) per 100 parts by weight of (b).

12. A composition according to claim 3, which contains in addition
    (d) a major amount, based on the weight of (b), of a heat-curing agent for epoxide resins selected from dicyandiamide, melamine, carboxylic acid hydrazides, succinimide, cyanoacetamide, 1-cyano-3-(lower alkyl)guanidines, the lower alkyl group or groups containing up to 3 carbon atoms, imidazoles and salts of carboxylic acids with tertiary amines, the amount of (d) and (b) together constituting a heat-curing amount for the epoxide resin (a).

13. A composition according to claim 12, which contains from 25 to 75 parts by weight of (b) per 100 parts by weight of (d).

14. A composition according to claim 10, in which the carboxylic acid hydrazide is oxalic acid dihydrazide, adipic acid dihydrazide, sebacic acid dihydrazide, or isophthalic acid dihydrazide.

15. A composition according to claim 10, in which the imidazole is 2-phenylimidazole, N-methylimidazole or 2-ethyl-4-methylimidazole.

16. A composition according to claim 12, in which the carboxylic acid hydrazide is oxalic acid dihydrazide, adipic acid dihydrazide, sebacic acid dihydrazide, or isophthalic acid dihydrazide.

17. A composition according to claim 12, in which the imidazole is 2-phenylimidazole, N-methylimidazole or 2-ethyl-4-methylimidazole.

18. A composition according to claim 3, in which (a) is a polyglycidyl ether, a polyglycidyl ester, an N,N'- diglycidyl hydantoin, or a poly(N-glycidyl) derivative of an aromatic amine.

19. A composition according to claim 1, cured by heating.

20. A process for curing an epoxide resin, comprising
(i) forming a composition as claimed in claim 1 and
(ii) heating the composition until the epoxide resin is cured.

* * * * *